(12) United States Patent
Diaz et al.

(10) Patent No.: US 8,326,991 B2
(45) Date of Patent: Dec. 4, 2012

(54) MAINTAINING RFID INFORMATION FOR VIRTUAL MACHINES

(75) Inventors: Joel D. Diaz, Durham, NC (US); Kevin S. Stansell, Raleigh, NC (US); Edward V. Zorek, Sr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 11/842,512

(22) Filed: Aug. 21, 2007

(65) Prior Publication Data

US 2009/0051492 A1 Feb. 26, 2009

(51) Int. Cl.
*G06F 15/173* (2006.01)
(52) U.S. Cl. .................................... 709/226; 340/572.1
(58) Field of Classification Search .................. 709/226; 340/572.1
See application file for complete search history.

(56) References Cited

U.S. PATENT DOCUMENTS

| | | | | |
|---|---|---|---|---|
| 6,025,780 | A * | 2/2000 | Bowers et al. ............. | 340/572.3 |
| 7,130,773 | B1 * | 10/2006 | Wong ............................. | 702/189 |
| 7,865,893 | B1 * | 1/2011 | Omelyanchuk et al. .......... | 718/1 |
| 2004/0087273 | A1 * | 5/2004 | Perttila et al. ................. | 455/41.2 |
| 2006/0022815 | A1 | 2/2006 | Fischer et al. | |
| 2006/0170565 | A1 * | 8/2006 | Husak et al. ............. | 340/825.49 |
| 2006/0253590 | A1 | 11/2006 | Nagy et al. | |
| 2006/0266832 | A1 | 11/2006 | Howarth et al. | |
| 2007/0027966 | A1 | 2/2007 | Singhal et al. | |
| 2007/0035396 | A1 * | 2/2007 | Chand et al. ................ | 340/572.1 |
| 2007/0075832 | A1 | 4/2007 | Morse et al. | |
| 2007/0106892 | A1 | 5/2007 | Engberg | |
| 2007/0112574 | A1 | 5/2007 | Greene | |
| 2007/0115124 | A1 | 5/2007 | Brignone et al. | |
| 2007/0236351 | A1 * | 10/2007 | Shah et al. ................. | 340/572.1 |
| 2008/0009344 | A1 * | 1/2008 | Graham et al. ................. | 463/25 |
| 2008/0284566 | A1 * | 11/2008 | Zai et al. ....................... | 340/7.56 |
| 2011/0023030 | A1 * | 1/2011 | Lim et al. ........................... | 718/1 |

FOREIGN PATENT DOCUMENTS

WO        WO 99/05658 A1    2/1999

OTHER PUBLICATIONS

Want, et al.; Bridging Physical and Virtual Worlds with Electronic Tags; May 15-20, 1999; pp. 370-377; CHI '99; Pittsburgh, PA, USA.
Zhang, et al.; Integration of RFID into Wireless Sensor Networks: Architectures, Opportunities and Challenging Problems; Proceedings of the Fifth International Conference on Grid and Cooperative Computing Workshops; IEEE 2006.

* cited by examiner

*Primary Examiner* — Patrice Winder
*Assistant Examiner* — Tauqir Hussain
(74) *Attorney, Agent, or Firm* — Edward J. Lenart; Cynthia G. Seal; Biggers & Ohanian, LLP.

(57) ABSTRACT

Methods, apparatus, and products for maintaining RFID information for virtual machines are disclosed that include establishing a virtual machine on a host computer, the host computer capable of supporting a plurality of virtual machines, the host computer comprising one or more RFID transponders; determining RFID information for the virtual machine; storing, in a specified one of the RFID transponders, the determined RFID information for the virtual machine; and upon request from an RFID reader, transmitting the stored RFID information as output from the specified RFID transponder to the requesting RFID reader.

18 Claims, 5 Drawing Sheets

MAINTAINING RFID INFORMATION FOR VIRTUAL MACHINES

BACKGROUND OF THE INVENTION

1. Field of the Invention

The field of the invention is data processing, or, more specifically, methods, apparatus, and products for maintaining Radio Frequency Identification ('RFID') information for virtual machines.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which computer software has evolved to take advantage of high performance hardware is in virtualization of physical computers into virtual machines. A virtual machine is a set of data structures and services that enables distribution of computer resources within a host computer to make the host computer function as if it were two or more independent computers. The host computer is capable of supporting a number of virtual machines, and each virtual machine runs its own operating system and one or more application programs. The host provides each virtual machine with its own set of computer resources, typically virtualized counterparts of the physical resources of the host.

Virtualization can help reduce the machine count in a data center, but virtualization of physical computers has drawbacks. Individual computers in large computing environments like data centers, for example, are typically tracked with RFID transponders that are written and queried with RFID readers in RFID networks. Several operating environments from less powerful physical computers can be completely installed in separate virtual machines on a powerful host computer, and the less powerful computers can be removed. Such virtualization, however, loses the one-to-one relationship between the RFID transponders and the operating environments that were previously installed on separate physical computers, each having its own RFID transponder.

SUMMARY OF THE INVENTION

Methods, apparatus, and products for maintaining RFID information for virtual machines are disclosed that include establishing a virtual machine on a host computer, the host computer capable of supporting a plurality of virtual machines, the host computer comprising one or more RFID transponders; determining RFID information for the virtual machine; storing, in a specified one of the RFID transponders, the determined RFID information for the virtual machine; and upon request from an RFID reader, transmitting the stored RFID information as output from the specified RFID transponder to the requesting RFID reader.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
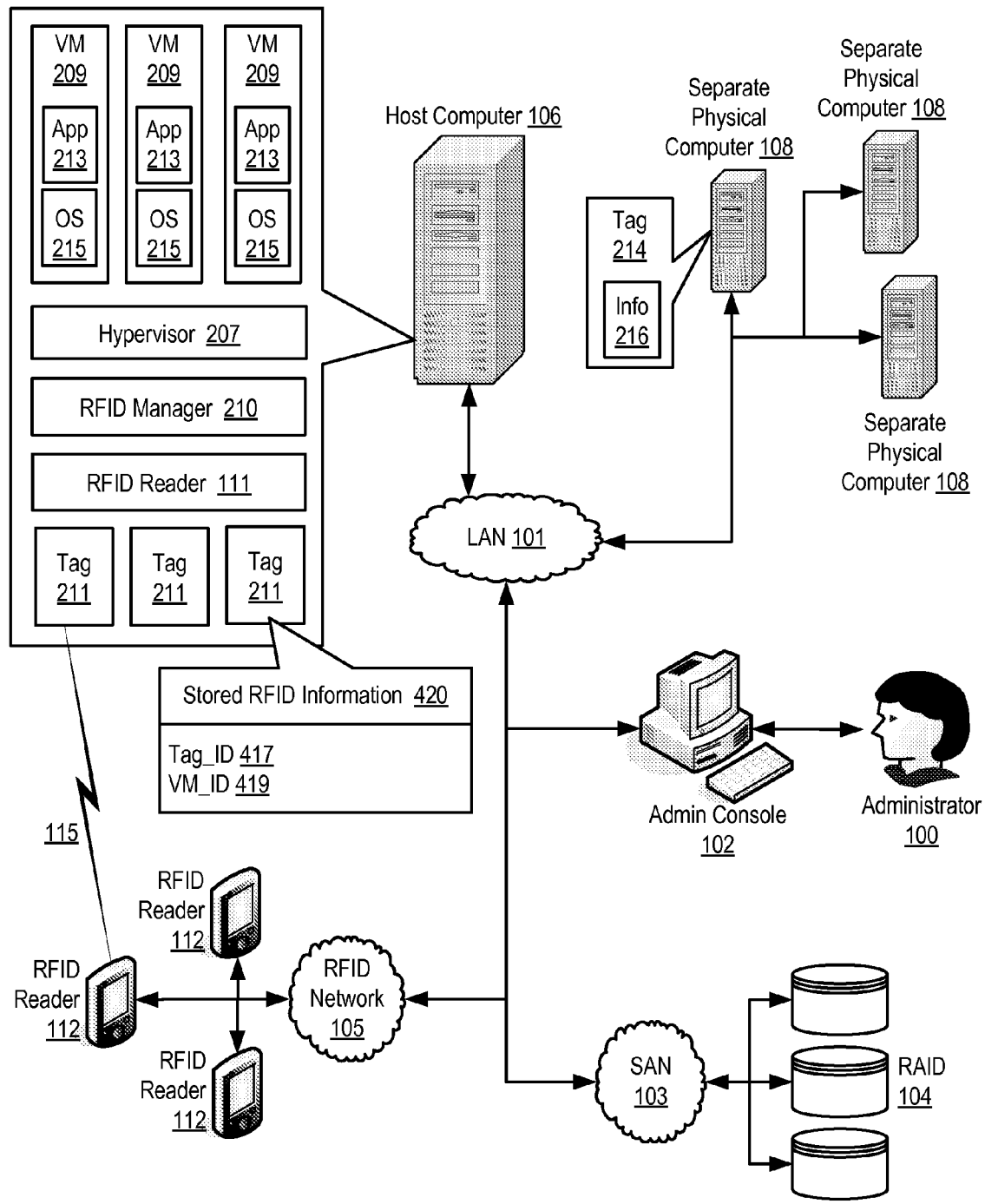
FIG. 1 sets forth a network diagram of an exemplary system for maintaining RFID information for virtual machines according to embodiments of the present invention.

Exemplary methods, apparatus, and products for maintaining RFID information for virtual machines in accordance with the present invention are described with reference to the accompanying drawings, beginning with FIG. 1. FIG. 1 sets forth a network diagram of a system for maintaining RFID information for virtual machines according to embodiments of the present invention. The system of FIG. 1 includes a host computer (106) which is a physical computer that supports a plurality of virtual machines (209). A virtual machine (209) is a set of data structures and services that enables distribution of computer resources within the physical computer to make the physical computer function as if it were two or more independent computers. Included in each virtual machine (209) is an operating system (215) and at least one application program (213). An operating system (215) is a set of computer programs that manage the hardware and software resources of a computer. An application program (213) is a set of computer program instructions implementing user-level data processing.

The host computer (106) in this example includes a number of RFID transponders (211). An RFID transponder (211) is a data storage and communications device that includes an antenna and circuitry that stores RFID information and transmits the RFID information upon request through the antenna in a radio signal (115). Note that the RFID transponders (211) in FIG. 1, and elsewhere in the drawings, are labeled 'Tags.' The term 'tag' or 'RFID tag' as used in this specification is a synonym for 'RFID transponder.' RFID transponders are typically classified as passive or active. A passive RFID transponder does not contain a battery. The power to transmit a radio signal through the antenna of a passive RFID transponder is supplied by the RFID reader when radio waves from the RFID reader are sent to the passive RFID transponder. An active RFID transponder uses a battery as a partial or complete source of power to run the circuitry and power the antenna. Whether passive or active, each RFID transponder has stored RFID information (420) in it. The stored RFID information (420) in the RFID transponder (211) may include, for example, an identification code (417) that uniquely identifies the RFID transponder (211), an identifications code (419) that uniquely identifies a virtual machine (209) for which information is stored on a particular RFID transponder, identification information for an operating system and applications assigned to run on a particular virtual machine, license information for an operating system and applications assigned to run on a particular virtual machine, and other items of information as will occur to those of skill in the art.

Requests for RFID information are typically transmitted to an RFID transponder from an 'RFID reader,' an external device that also contains a radio transceiver and an antenna along with powered data storage that the reader uses to transmit a request for RFID information, receive the RFID information from an RFID transponder, process the RFID information, or store the RFID information for later transfer to other computer storage. An RFID reader can not only read information from an RFID transponder, but also write RFID information onto an RFID transponder. Multiple RFID readers can be organized in networks to gather RFID information from many RFID transponders and transfer it back to a central system. The maximum practical distance between an RFID reader's antenna and an RFID transponder varies, depending on the application. Credit cards and ID badges have to be brought fairly close to readers, somewhat like bar codes. For other applications, passive RFID tags can be read up to approximately 10 feet away, while active tags with batteries can be read several hundred feet from the reader. The example system of FIG. 1 includes several RFID readers (112) organized in an RFID network (105).

The host computer (106) in the example of FIG. 1 also includes an RFID manager (210). An RFID manager (210) is a module of computer program instructions for storing RFID information in an RFID transponder (211). The host computer (106) also includes an RFID reader that the RFID manager uses to write RFID information onto the RFID tags (211).

The host computer (106) in the example of FIG. 1 includes a hypervisor (207). A hypervisor (207) is a layer of system software that runs on the computer hardware beneath the operating system layer to allow multiple operating systems (215) to run on a host computer (106) at the same time. A hypervisor (207) allows multiple operating systems (215) to run on a host computer (106) at the same time by providing each operating system (215) with its own set of computer resources through the use and establishment of virtual machines on the host computer. These computer resources are typically virtualized counterparts of the physical resources of a computing system.

The exemplary system of FIG. 1 includes an administrative console (102) that is operated by a system administrator (100). The administrative console (102) of FIG. 1 is a computing device used to operate user interfaces to the hypervisor, the RFID reader, and other components of the system of FIG. 1 for maintaining RFID information for virtual computers. The administrative console (102) may be implemented as a workstation connected through a local area network ('LAN')(101) to other components of the system. The administrative console (102) allows the system administrator (100) to configure the exemplary system of FIG. 1 by providing a user interface for the system administrator (100) to interact with the system to configure the hypervisor (207), RFID manager (210), and virtual machines (209) of the host computer (106), as well as the separate physical computers (108), the RAID array (104), and the RFID network (105) of RFID readers (112).

The exemplary system of FIG. 1 generally operates to maintain RFID information for virtual machines (209) according to embodiments of the present invention by, first, establishing (402) at least one virtual machine (209) on the host computer (106). Establishing a virtual machine on the host computer is implemented through the hypervisor, which maintains the structures and services required to support virtual machines, providing a user interface on the administrative console (102) through which a system administrator (100) initiates the establishment of a virtual machine and enters the data needed to describe to the hypervisor the characteristics of a virtual machine, the amount of memory to be allocated to a new virtual machine, the quantity of processing resources to be allocated to the new virtual machine, the number of I/O ports to be provided to the new virtual machine, and so on.

The system of FIG. 1 also operates to maintain RFID information for virtual machines (209) by determining RFID information for the virtual machine (209). A new virtual machine may optionally have no relation to any separate physical computer. The new virtual machine may, for example, simply represent an operating environment for an entirely new application—or an additional instance of an application installed to scale up processing capacity in a data center. In such an example, determining RFID information for the new virtual machine may be carried out by data entry by a system administrator through an administrative console through a user interface which communicates the new RFID information to the RFID manager which writes the new RFID information onto an RFID tag for the new virtual machine. The user interface on the administrative console may be provided by the hypervisor or the RFID manager itself.

As an alternative to determining RFID information for a new virtual machine not associated with any separate physical computer, for example, a new virtual machine may be established in particular to virtualize operations from an existing separate physical computer (108). In such an example, the separate physical computer has RFID information (216) in an RFID transponder (214) in the separate physical computer, and maintaining RFID information for the new virtual machine may be carried out by moving all systems software and all application software from the separate physical computer (108) to a new virtual machine on the host computer (106). Then determining RFID information for the virtual machine is carried out by determining RFID information for the virtual machine in dependence upon the RFID information (216) of the separate physical computer. As a practical matter, determining RFID information for the virtual machine in dependence upon the RFID information of the separate physical computer will usually involve reusing most of the RFID information from the separate physical computer as RFID information for the new virtual machine. The RFID tag number will change, and the virtual machine identification will be added, but the information regarding the operating environment, the identity of the applications, the identity of the operating system, the licenses, and so on, will generally be reused. In such an example, maintaining RFID information for the new virtual machine often also includes deactivating the RFID transponder of the separate physical computer. The RFID information for the separate physical computer may be obtained from system storage (104) by the hypervisor (207) or by the RFID manager (210) at the behest of a system administrator (100), or the system administrator can retype the RFID information through the administrative console (102) into the hypervisor or the RFID manager. The separate physical computer may, for example, remain in the same data center with the host computer on which the new virtual machine is established, in which case the RFID information in the RFID transponder on the separate physical computer is no long valid and risks confusion if it is read by any RFID reader of the RFID network.

However the RFID information for a virtual machine is determined, maintaining RFID information for virtual machines in the system of FIG. 1 includes storing, in a specified one of the RFID transponders (211), the determined RFID information for the virtual machine (209); and upon request from an RFID reader (112), transmitting the stored RFID information (420) as output from the specified RFID transponder to the requesting RFID reader. When the determined RFID information arrives in the host computer, either through the hypervisor or through the RFID manager, the RFID manager operates the RFID reader (111) in the host computer to write the determined RFID information onto a specified one of the RFID tags (211) in the host computer (106). Storing the determined RFID information in an RFID transponder may optionally also include reading from interim storage (104) the determined RFID information for a virtual machine.

The exemplary system of FIG. 1 optionally also maintains RFID information for virtual machines (209) by storing (422), after determining RFID information for the virtual machine (209), the determined RFID information (418) in interim storage available to an RFID manager (210) of the host computer (106). In the system of FIG. 1, the interim storage that stores the determined RFID information (418) is implemented with a Redundant Array of Independent Disks (RAID) (104) and a Storage Area Network (SAN) (103) which are connected for data communications through a local area network ('LAN') (101) to the host computer (106). The SAN (103) and the RAID array (104) function to organize disk storage as virtual drives, which of which is presented as an actual disk drive to the hypervisor (207) in the host computer and to operating systems (215) in the host computer. The RAID (104) and SAN (103) of FIG. 1 represent an example of interim storage for purposes of explanation, not for limitation of the present invention. Interim storage may be implemented for maintaining RFID information for virtual machines according to embodiments of the present invention, not only with RAID arrays and SANs, but also with local storage in RFID readers or other individual computers not on networks, and in other ways as will occur to those of skill in the art.

The system of FIG. 1 also optionally maintains RFID information for virtual machines (209) by enabling the RFID transponders (211) in an RFID network (105) of RFID readers (112). An RFID network (105) of RFID readers (112) is typically implemented by a number of linked RFID readers, at least one computing device that manages the RFID information, and middleware to manage the communication between the computing device and the linked RFID readers. The RFID readers may be linked wirelessly or through wirelines. The computing device that manages the RFID information may be implemented as a server, or as any other computing device as will occur to those of skill in the art, which may also be coupled for data communications to other computers through a data communications network.

The arrangement of computers, RFID readers (112), and other devices making up the exemplary system illustrated in FIG. 1 are for explanation, not for limitation. Data processing systems useful according to various embodiments of the present invention may include servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
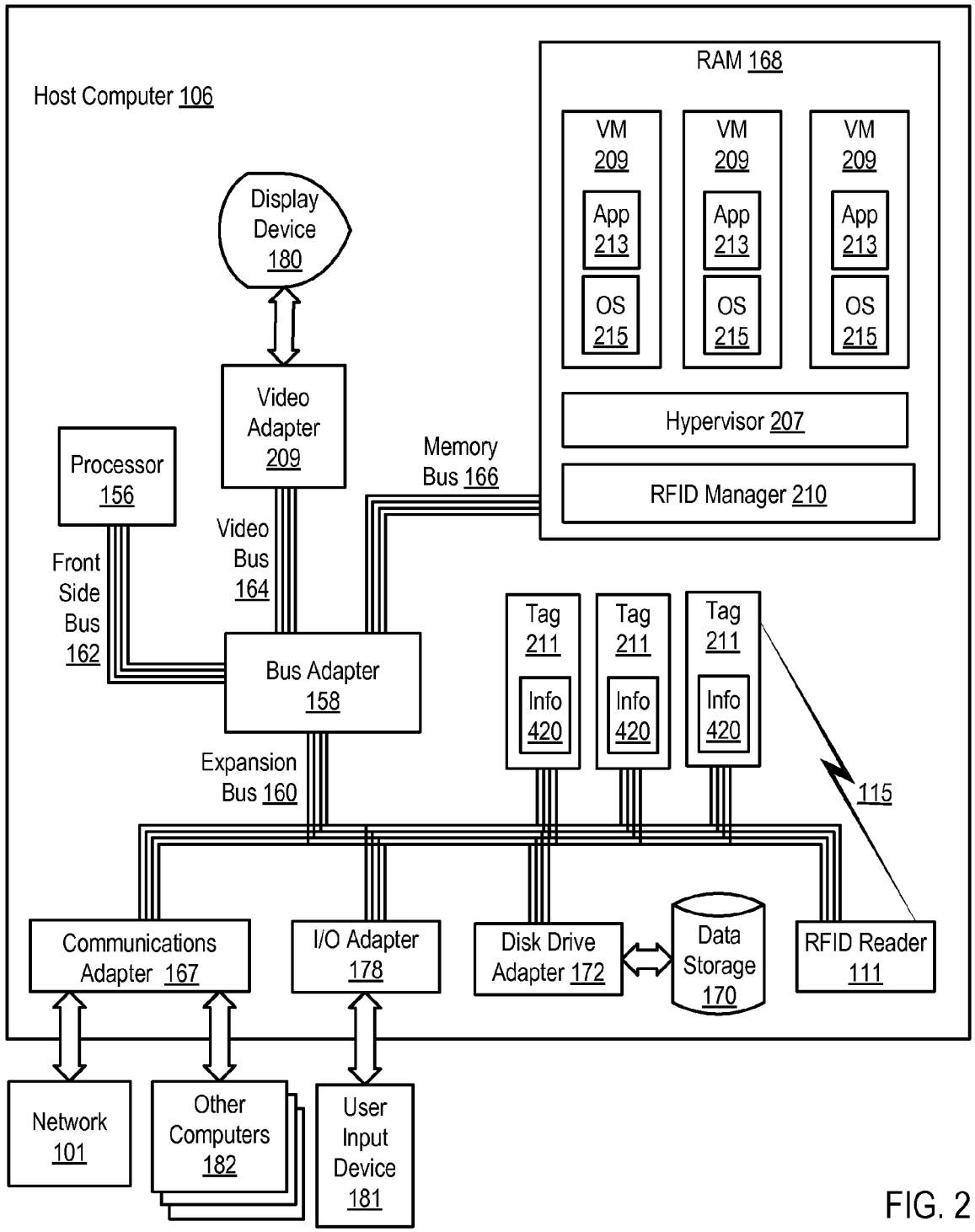
FIG. 2 sets forth a block diagram of automated computing machinery comprising an exemplary computer useful in maintaining RFID information for virtual machines according to embodiments of the present invention.

For further explanation, FIG. 2 sets forth a block diagram of automated computing machinery comprising an exemplary host computer (106) useful in maintaining RFID information for virtual machines according to embodiments of the present invention. The host computer (106) of FIG. 2 includes at least one computer processor (156) or 'CPU' as well as random access memory (168) ('RAM') which is connected through a high speed memory bus (166) and bus adapter (158) to processor (156) and to other components of the host computer (106).

Stored in RAM (168) are several virtual machines (209), each of which includes an operating system (215) and at least one application program (213). Operating systems (215) useful in virtual machines according to embodiments of the present invention include UNIX™, Linux™, Microsoft XP™, AIX™, IBM's i5/OS™, and others as will occur to those of skill in the art. Also stored in RAM (168) is a hypervisor (207) and an RFID manager (210). The virtual machines (209), the hypervisor (207), and the RFID manager (210) in the example of FIG. 2 are shown in RAM (168), but many components of such software typically are stored in non-volatile memory also, such as, for example, on a disk drive (170). The host computer (106) of FIG. 2 also includes several RFID transponders (211), enough of them so that there is sufficient RFID information storage to store all the RFID information for all of the virtual machines (209). The host computer of FIG. 2 also includes an RFID reader that is capable, under program control from the RFID reader, of transmitting a radio signal (115) to write RFID information (420) onto each of the RFID transponders (211) in the host computer (106).

Computer program instructions in the hypervisor and the RFID manager enable the host computer (106) of FIG. 2 to operate generally to maintain RFID information (420) for virtual machines (209) according to embodiments of the present invention by establishing a virtual machine (209) on a host computer (106), where the host computer is capable of supporting a plurality of virtual machines (209) and the host computer includes a multiplicity of RFID transponders (211); determining RFID information (420) for the virtual machine; storing, in a specified one of the RFID transponders, the determined RFID information for the virtual machine; and upon request from an RFID reader, transmitting the stored RFID information as output from the specified RFID transponder to the requesting RFID reader.

The host computer (106) of FIG. 2 includes disk drive adapter (172) coupled through expansion bus (160) and bus adapter (158) to processor (156) and other components of the host computer (106). Disk drive adapter (172) connects non-volatile data storage to the host computer (106) in the form of disk drive (170). Disk drive adapters useful in computers for maintaining RFID information for virtual machines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example host computer (106) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example host computer (106) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary host computer (106) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for maintaining RFID information for virtual machines according to embodiments of the present invention include modems for wired dial-up communications, Ethernet (IEEE 802.3) adapters for wired data communications network communications, and 802.11 adapters for wireless data communications network communications.

Figure 3:
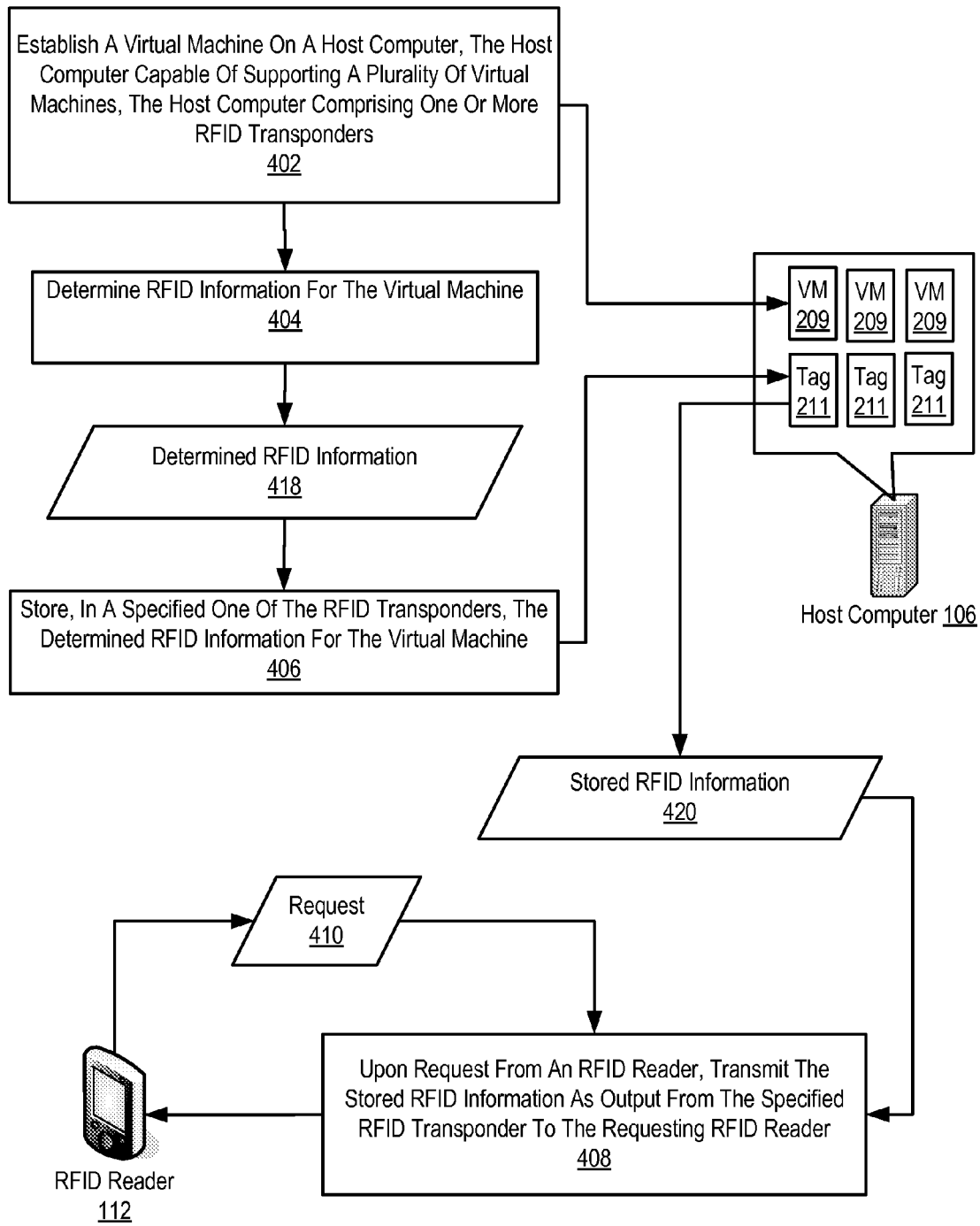
FIG. 3 sets forth a flow chart illustrating an exemplary method of maintaining RFID information for virtual machines according to embodiments of the present invention.

For further explanation, FIG. 3 sets forth a flow chart illustrating an exemplary method of maintaining RFID information for virtual machines according to embodiments of the present invention. The method of FIG. 3 includes establishing (402) a virtual machine (209) on a host computer (106). In this example, the host computer (106) is capable of supporting, by use of a hypervisor as explained above, a number of virtual machines (209), not just one, and the host computer (106) includes a number of RFID transponders (112). Establishing a virtual machine on the host computer may be carried out by defining the new virtual machine through a hypervisor (reference 207 on FIG. 1) and providing through the hypervisor to the new virtual machine an operating system, one or more application programs, and its own set of computer resources upon which to run its operating system and its application programs, the computer resources assigned to the new virtual machine typically being virtualized counterparts of the physical resources of the underlying physical host computer upon which the virtual machine is installed.

The method of FIG. 3 also includes determining (404) RFID information for the virtual machine (209). In the method of FIG. 3, determining (404) RFID information for the virtual machine may be carried out by gathering the information that is associated with the virtual machine, such as, for example, the virtual machine identification, identification of the operating environment, the identity of the applications to be run on the new virtual machine, the identity of the operating system to be run on the new virtual machine, license information for the software to be run on the new virtual machine, and so on. As explained in more detail below with reference to FIG. 4, a new virtual machine may be established in particular to virtualize operations from an existing separate physical computer. In addition, however, a newly established virtual machine may optionally have no relation to any separate physical computer. The new virtual machine may, for example, simply represent an operating environment for an entirely new application—or an additional instance of an application installed to scale up processing capacity in a data center. In such an example, determining RFID information for the new virtual machine may be carried out by data entry by a system administrator through an administrative console through a user interface which communicates the new RFID information to an RFID manager which writes the new RFID information onto an RFID tag (211) for the new virtual machine. The user interface on the administrative console may be provided by a hypervisor or by the RFID manager itself.

The method of FIG. 3 also includes storing (406), in a specified one of the RFID transponders, the determined RFID information (418) for the virtual machine (209). Storing (406) the determined RFID information (418) in a specified one of the RFID transponders is carried out by providing the determined RFID information through a user interface to an RFID manager (210 on FIGS. 1 and 2), optionally through a hypervisor. The RFID manager then operates an RFID reader (111 on FIGS. 1 and 2) to write the determined RFID information onto the RFID transponder with a radio signal. The RFID transponder is said to be "a specified one of the RFID transponders" because the host computer can support more than one RFID transponder, and, for the cases in which the host computer does support more than one RFID transponder, the RFID information for a newly established virtual machine is stored on only one of the RFID transponders on the host computer. RFID information for more than one virtual machine can optionally be stored on a single RFID transponder, and that single RFID transponder would then be "a specified one of the RFID transponders."

The method of FIG. 3 also includes transmitting (408), upon request (410) from an RFID reader (112), the stored RFID information (420) as output from the specified RFID transponder (211) to the requesting RFID reader (112). The request (410) is in the form of a radio signal transmitted from the RFID reader (112) and received by the specified RFID transponder in which the RFID information is stored. The transmission of the stored RFID information to the requesting RFID reader also is in the form of a radio signal transmitted from the RFID transponder (211) to the RFID reader (112). The RFID reader (112) transmitting the request (410) optionally may be one of many RFID readers in an RFID network (105 in FIG. 1) of RFID readers.

Figure 4:
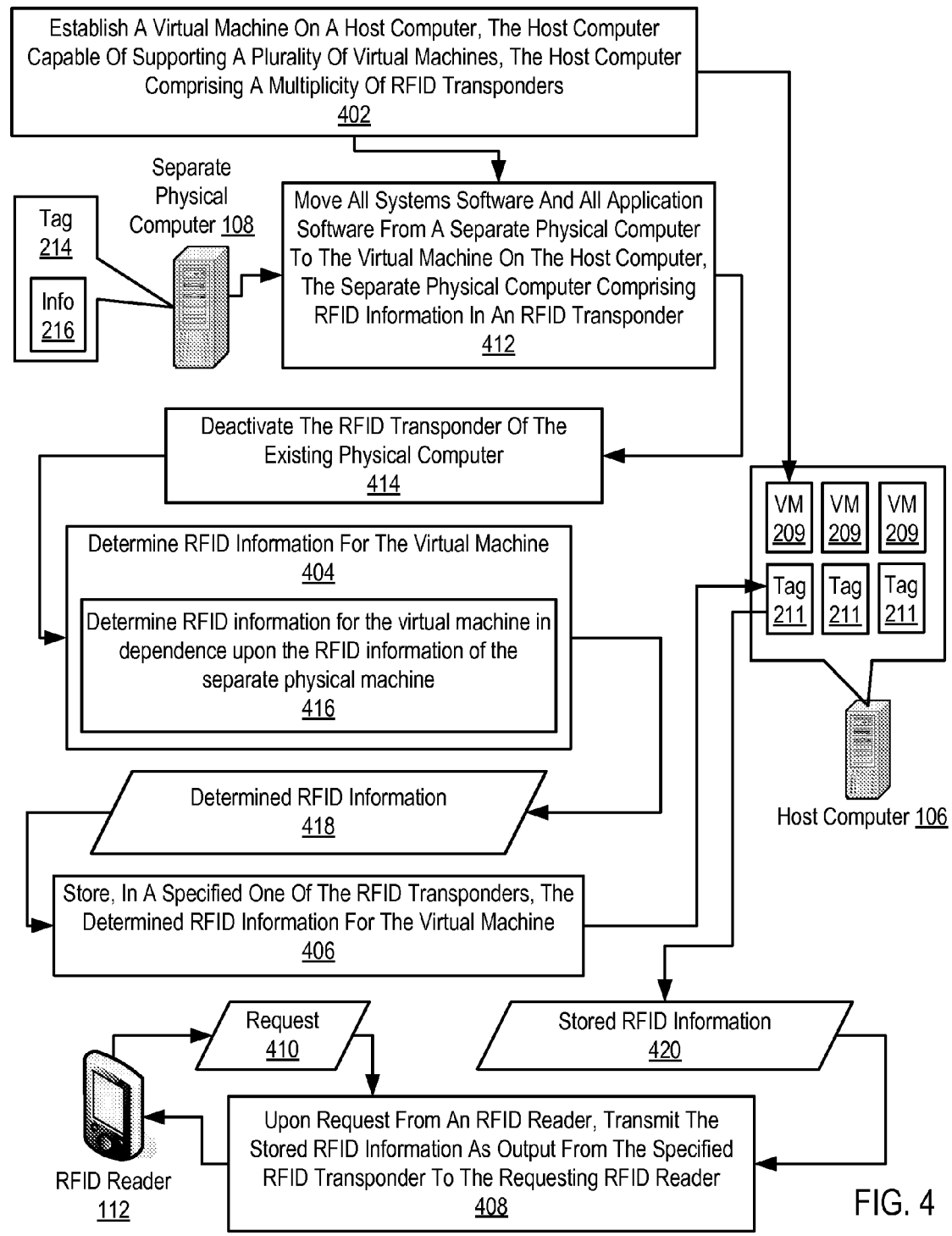
FIG. 4 sets forth a flow chart illustrating a further exemplary method of maintaining RFID information for virtual machines according to embodiments of the present invention.

For further explanation, FIG. 4 sets forth a flow chart illustrating a further exemplary method for maintaining RFID information for virtual machines according to embodiments of the present invention. The method of FIG. 4 is similar to the method of FIG. 3, including as it does, establishing (402) a virtual machine (209) on a host computer (106), determining (404) RFID information for the virtual machine (209), storing (406) the determined RFID information (418) in a specified RFID transponder, and transmitting (408) the stored RFID information (420) as output from the specified RFID transponder to a requesting RFID reader (112). As explained above, a newly established virtual machine may optionally have no relation to any separate physical computer. As an alternative to determining RFID information for a new virtual machine not associated with any separate physical computer, however, in the example of FIG. 4, a new virtual machine (209) is established to virtualize operations from an existing separate physical computer (108). In the example of FIG. 4, the separate physical computer has RFID information (216) in an RFID transponder (214) in the separate physical computer (108), and the method of FIG. 4, therefore, unlike the method of FIG. 3, also includes moving (412) all systems software and all application software from the separate physical computer (108) to the virtual machine (209) on the host computer (106).

The method of FIG. 4 also includes deactivating (414) the RFID transponder (214) of the separate physical computer (108). The RFID information (216) for the separate physical computer may be obtained from system storage (104 on FIG. 1) by a hypervisor or by an RFID manager at the behest of a system administrator, or the system administrator can retype the RFID information through an administrative console through a hypervisor or through an RFID manager, which then uses an RFID reader to write the RFID information onto a specified RFID transponder (211). The separate physical computer (108) may, for example, remain in the same data center with the host computer (106) on which the new virtual machine (209) is established, in which case the RFID information in the RFID transponder on the separate physical computer is no long valid and risks confusion if it is read by an RFID reader.

Also in the method of FIG. 4, determining (404) RFID information for the virtual machine is carried out by determining (416) RFID information for the virtual machine in dependence upon the RFID information (216) of the separate physical computer (108). As a practical matter, determining (416) RFID information for the virtual machine in dependence upon the RFID information (216) of the separate physical computer (108) will usually involve reusing most of the RFID information from the separate physical computer as RFID information for the newly established virtual machine. The RFID tag number (417 on FIG. 1) will change, and the virtual machine identification (419 on FIG. 1) will be added, but the information regarding the operating environment, the identity of the applications to be run on the virtual machine, the identity of the operating system, the licenses, and so on, will generally be reused.

Figure 5:
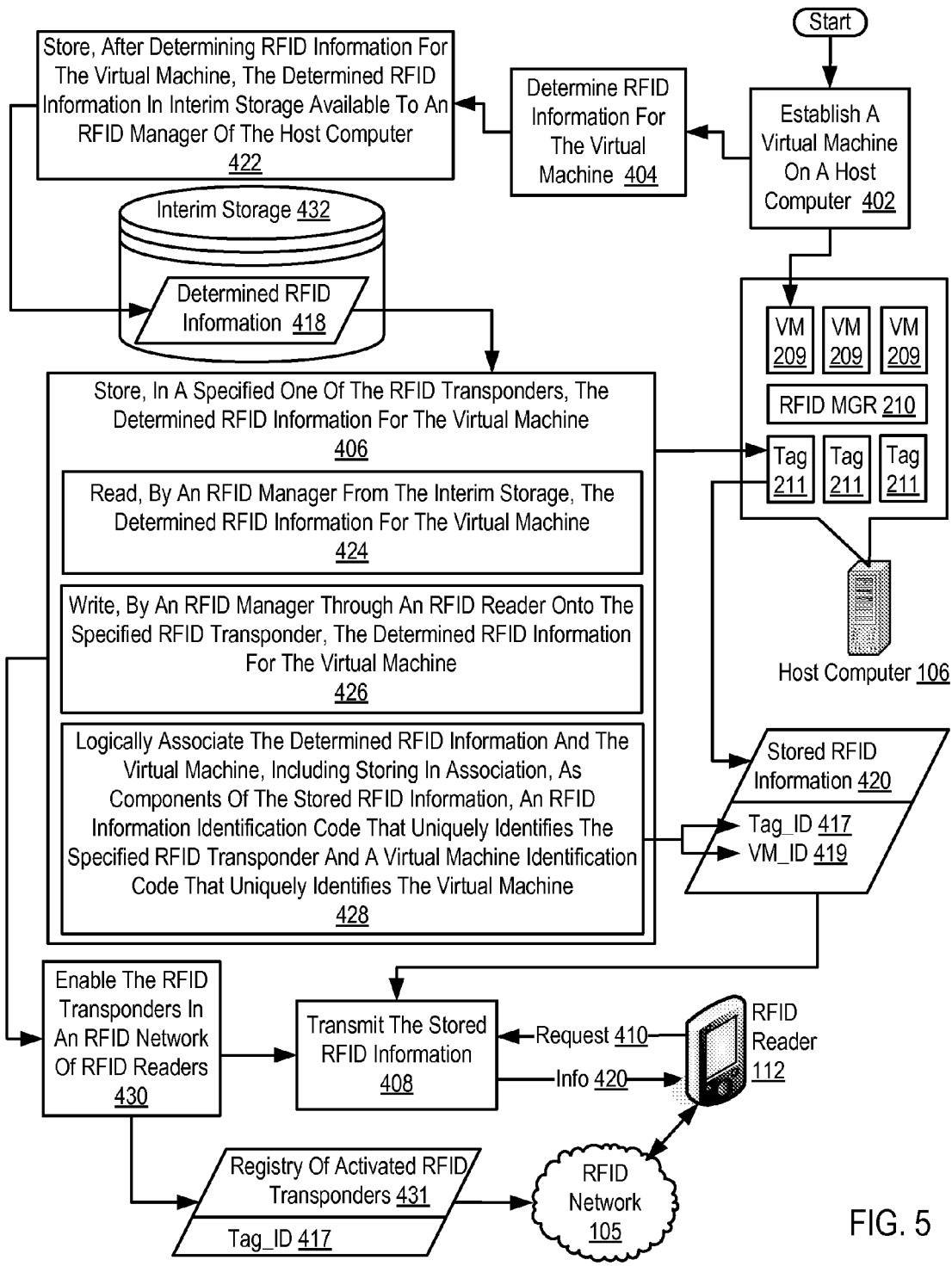
FIG. 5 sets forth a flow chart illustrating a further exemplary method of maintaining RFID information for virtual machines according to embodiments of the present invention.

For further explanation, FIG. 5 sets forth a flow chart illustrating a further exemplary method for maintaining RFID information for virtual machines according to embodiments of the present invention. The method of FIG. 5 is similar to the method of FIG. 3, including as it does, establishing (402) a virtual machine (209) on a host computer (106), determining (404) RFID information for the virtual machine (209), storing (406) the determined RFID information (418) in a specified RFID transponder, and transmitting (408) the stored RFID information (420) as output from the specified RFID transponder to a requesting RFID reader (112). The method of FIG. 5, however, unlike the method of FIG. 3, also includes storing (422), after determining (404) RFID information for the virtual machine, the determined RFID information (418) in interim storage (432) available to an RFID manager (210) of the host computer (106). Storing (422) the determined RFID information (418) in interim storage (432) may be carried out by a hypervisor (207 on FIG. 1) or by an RFID manager (210) at the behest of a system administrator through a user interface on an administrative console. The user interface on the administrative console may be provided by the hypervisor or the RFID manager. The interim storage (432) in which the determined RFID information (418) is stored may be implemented with a RAID array (reference 104 in FIG. 1), a SAN (reference 103 in FIG. 1), or with any other form of computer storage as may occur to those of skill in the art. Such storage is termed 'interim' because the ultimate storage location for the RFID information for a virtual machine is a specified RFID transponder.

In the method of FIG. 5, storing (406), in a specified one of the RFID transponders, the RFID information for the virtual machine also includes reading (424), by the RFID manager from the interim storage (432), the determined RFID information for the virtual machine and writing (426), by the RFID manager through an RFID reader onto the specified RFID transponder (211), the determined RFID information (418) for the virtual machine (209). Reading (424) the determined RFID information (418) from interim storage (432) is carried out by transferring from interim storage, by the RFID manager through a data communications network, computer data representing the determined RFID information. The computer data that represents the determined RFID information may also be transferred through any other form of data communication between the RFID manager and the interim storage as may occur to those of skill in the art, such as, for example, a direct read from local storage (170 on FIG. 2). Writing (426) the determined RFID information (418) is carried out by the RFID manager (210), by transmitting the determined RFID information (418) through an RFID reader (111 on FIG. 2) on the host computer (106) to the specified RFID transponder (211) in the form of a radio signal (115 on FIG. 2).

Also in the method of FIG. 5, storing (406), in a specified one of the RFID transponders, the determined RFID information for the virtual machine includes logically associating (428) the determined RFID information and the virtual machine. In this example, logically associating the determined RFID information and the virtual machine is carried out by storing in association, as components of the stored RFID information (420), an RFID information identification code (417) that uniquely identifies the specified RFID transponder (211) and a virtual machine identification code (419) that uniquely identifies the virtual machine (209).

The method of FIG. 5 also includes enabling (430) the RFID transponders (211) in an RFID network (105) of RFID readers. Enabling (430) the RFID transponders (211) may be carried out by registering the RFID transponders (211) for the virtual machines in a registry (431) of RFID transponders that are activated and authorized to provide RFID information within the RFID network (105). In this example, an RFID reader (112) that requests (410) the stored RFID information (420) is an RFID reader of the RFID network (105). The RFID network (105) of RFID readers (112) typically includes a number of linked RFID readers, at least one computing device that manages the RFID information, and middleware to manage the communication between the computing device and the linked RFID readers. The RFID readers may be linked wirelessly or through wirelines. The computing device that manages the RFID information may be implemented as a server, or as any other computing device as will occur to those of skill in the art, which may also be coupled for data communications to other computers through a data communications network.

Exemplary embodiments of the present invention are described largely in the context of a fully functional computer system for maintaining RFID information for virtual machines. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining Radio Frequency Identification ('RFID') information for virtual machines, the method comprising:
    establishing a virtual machine on a host computer, the host computer capable of supporting a plurality of virtual machines, the host computer comprising one or more RFID transponders;
    determining RFID information for the virtual machine;
    storing, in a specified one of the RFID transponders, the determined RFID information for the virtual machine; and
    upon request from an RFID reader, transmitting the stored RFID information as output from the specified RFID transponder to the requesting RFID reader.

2. The method of claim 1 further comprising:
    moving all systems software and all application software from a separate physical computer to the virtual machine on the host computer, the separate physical computer comprising RFID information in an RFID transponder;
    wherein determining RFID information for the virtual machine further comprises determining RFID information for the virtual machine in dependence upon the RFID information of the separate physical computer.

3. The method of claim 2 further comprising deactivating the RFID transponder of the separate physical computer.

4. The method of claim 1 further comprising storing, after determining RFID information for the virtual machine, the determined RFID information in interim storage available to an RFID manager of the host computer, wherein storing, in a specified one of the RFID transponders, the RFID information for the virtual machine further comprises:
    reading, by the RFID manager from the interim storage, the determined RFID information for the virtual machine; and
    writing, by the RFID manager through an RFID reader onto the specified RFID transponder, the determined RFID information for the virtual machine.

5. The method of claim 1 wherein storing, in a specified one of the RFID transponders, the determined RFID information for the virtual machine further comprises logically associating the determined RFID information and the virtual machine, including storing in association, as components of the stored RFID information, an RFID information identification code that uniquely identifies the specified RFID transponder and a virtual machine identification code that uniquely identifies the virtual machine.

6. The method of claim 1 further comprising enabling the RFID transponders in an RFID network of RFID readers, wherein the requesting RFID reader comprises an RFID reader of the RFID network.

7. Apparatus for maintaining Radio Frequency Identification ('RFID') information for virtual machines, the apparatus comprising a computer processor, a computer memory operatively coupled to the computer processor, the computer memory having disposed within it computer program instructions capable of:
    establishing a virtual machine on a host computer, the host computer capable of supporting a plurality of virtual machines, the host computer comprising one or more RFID transponders;
    determining RFID information for the virtual machine;
    storing, in a specified one of the RFID transponders, the determined RFID information for the virtual machine; and
    upon request from an RFID reader, transmitting the stored RFID information as output from the specified RFID transponder to the requesting RFID reader.

8. The apparatus of claim 7 further comprising:
    computer program instructions capable of moving all systems software and all application software from a separate physical computer to the virtual machine on the host computer, the separate physical computer comprising RFID information in an RFID transponder;
    wherein determining RFID information for the virtual machine further comprises determining RFID information for the virtual machine in dependence upon the RFID information of the separate physical computer.

9. The apparatus of claim 7 further comprising computer program instructions capable of deactivating the RFID transponder of the separate physical computer.

10. The apparatus of claim 7 further comprising computer program instructions capable of storing, after determining RFID information for the virtual machine, the determined RFID information in interim storage available to an RFID manager of the host computer, wherein storing, in a specified one of the RFID transponders, the RFID information for the virtual machine further comprises:
    reading, by the RFID manager from the interim storage, the determined RFID information for the virtual machine; and
    writing, by the RFID manager through an RFID reader onto the specified RFID transponder, the determined RFID information for the virtual machine.

11. The apparatus of claim 7 wherein storing, in a specified one of the RFID transponders, the determined RFID information for the virtual machine further comprises logically associating the determined RFID information and the virtual machine, including storing in association, as components of the stored RFID information, an RFID information identification code that uniquely identifies the specified RFID transponder and a virtual machine identification code that uniquely identifies the virtual machine.

12. The apparatus of claim 7 further comprising computer program instructions capable of enabling the RFID transponders in an RFID network of RFID readers, wherein the requesting RFID reader comprises an RFID reader of the RFID network.

13. A computer program product for maintaining Radio Frequency Identification ('RFID') information for virtual machines, the computer program product disposed on a computer readable, recordable storage medium wherein the computer readable, recordable storage medium is not a signal, the computer program product comprising computer program instructions capable of:

establishing a virtual machine on a host computer, the host computer capable of supporting a plurality of virtual machines, the host computer comprising one or more RFID transponders;

determining RFID information for the virtual machine;

storing, in a specified one of the RFID transponders, the determined RFID information for the virtual machine; and upon request from an RFID reader, transmitting the stored RFID information as output from the specified RFID transponder to the requesting RFID reader.

14. The computer program product of claim 13 further comprising:

computer program instructions capable of moving all systems software and all application software from a separate physical computer to the virtual machine on the host computer, the separate physical computer comprising RFID information in an RFID transponder;

wherein determining RFID information for the virtual machine further comprises determining RFID information for the virtual machine in dependence upon the RFID information of the separate physical computer.

15. The computer program product of claim 13 further comprising computer program instructions capable of deactivating the RFID transponder of the separate physical computer.

16. The computer program product of claim 13 further comprising computer program instructions capable of storing, after determining RFID information for the virtual machine, the determined RFID information in interim storage available to an RFID manager of the host computer, wherein storing, in a specified one of the RFID transponders, the RFID information for the virtual machine further comprises:

reading, by the RFID manager from the interim storage, the determined RFID information for the virtual machine; and writing, by the RFID manager through an RFID reader onto the specified RFID transponder, the determined RFID information for the virtual machine.

17. The computer program product of claim 13 wherein storing, in a specified one of the RFID transponders, the determined RFID information for the virtual machine further comprises logically associating the determined RFID information and the virtual machine, including storing in association, as components of the stored RFID information, an RFID information identification code that uniquely identifies the specified RFID transponder and a virtual machine identification code that uniquely identifies the virtual machine.

18. The computer program product of claim 13 further comprising computer program instructions capable of enabling the RFID transponders in an RFID network of RFID readers, wherein the requesting RFID reader comprises an RFID reader of the RFID network.

* * * * *